C. WEST.
Door-Check for Carriages, &c.

No. 203,227.  Patented April 30, 1878.

WITNESSES.  INVENTOR.

Columbus West

UNITED STATES PATENT OFFICE.

COLUMBUS WEST, OF PITTSBURG, PENNSYLVANIA.

IMPROVEMENT IN DOOR-CHECKS FOR CARRIAGES, &c.

Specification forming part of Letters Patent No. 203,227, dated April 30, 1878; application filed February 23, 1878.

*To all whom it may concern:*

Be it known that I, COLUMBUS WEST, of Pittsburg, in the county of Allegheny and State of Pennsylvania, have invented a new and improved mode of preventing carriage-doors from jarring in shutting, and rattling when the carriage is in motion; and I do hereby declare that the following is a full and exact description thereof, reference being had to the accompanying drawings, and to the letters of reference marked thereon.

The nature of my invention consists in providing carriages constructed without rabbet on lock or door pillar with a plate of any given size, made of iron or of any other suitable material, fastened to the back of the lock-pillar as a jamb or door-stop, a substitute for the rabbet, upon which I place a piece of gum rubber, against which the door shuts and rests.

To enable others skilled in the art to make and use my invention, I will proceed to describe its construction and operation.

Figure 1:
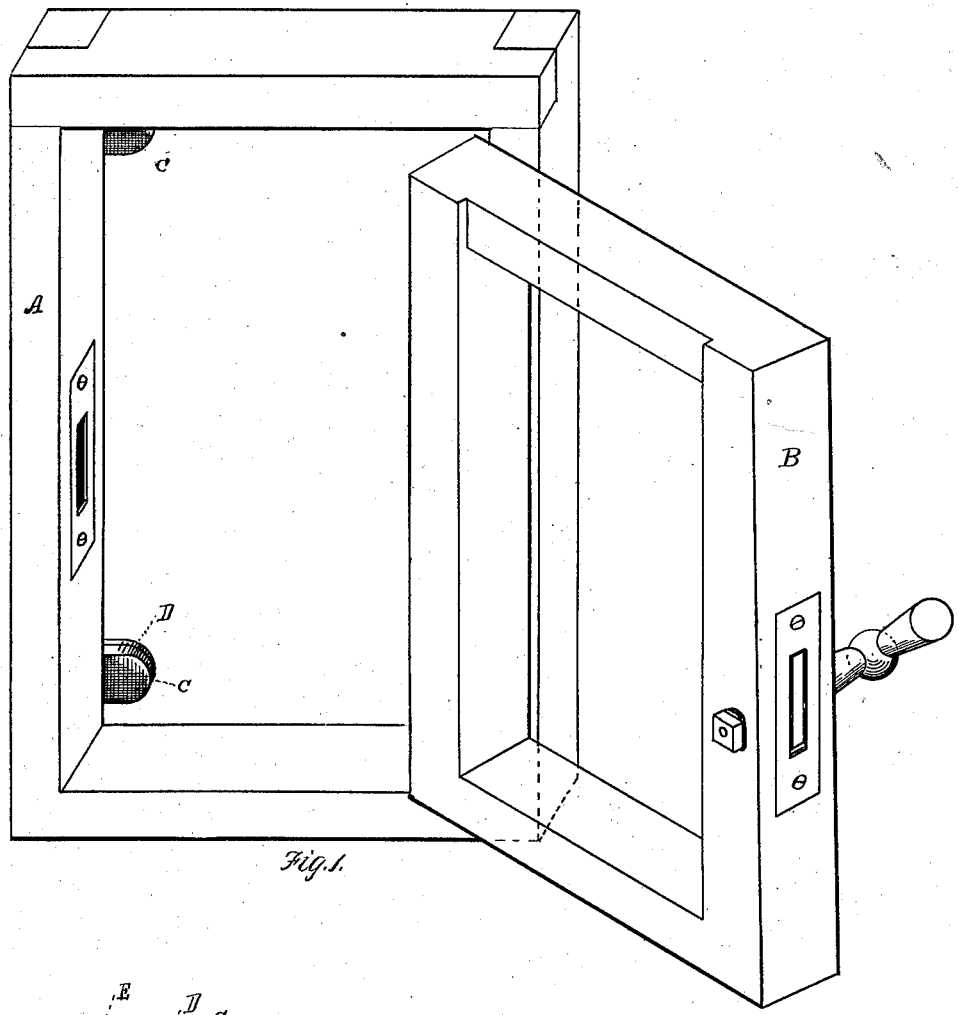
Figure 2:
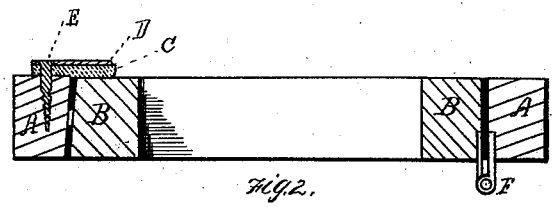
Figures 3, 4:
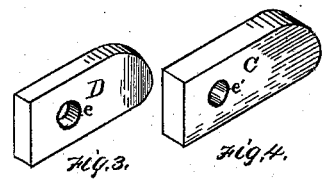

In the accompanying drawings, Figure 1 is a face view with door of carriage open, showing lock-pillar A, with plate D and rubber C C in position. Fig. 2 is a sectional view with door closed, showing lock-pillar A, with rubber C, resting upon plate D, fastened to lock-pillar A by means of screw E, with door B closed and resting against elastic stop C. Fig. 3 is plate D, and Fig. 4 is rubber C.

The gum rubber C may be made of any desired size and of a sufficient thickness, placed upon plate D, to tighten the door when closed, and, from and by its elasticity, prevent jar, and also prevent rattle when the carriage is in use and motion. The plate D, securing and holding rubber C in position, may be fastened to lock-pillar A with a screw or by any other known means.

What I claim as my invention, and desire to secure by Letters Patent, is—

The elastic stop C and plate D, in combination with a carriage-door and lock-pillar thereof, adapted to serve as a door-check when the rabbet on door or lock pillar is dispensed with, substantially as described and shown, for the purpose set forth.

COLUMBUS WEST.

Witnesses:
J. CHAS. DICKEN,
AMOS KELLEY.